United States Patent [19]

Beals et al.

[11] Patent Number: 4,557,550

[45] Date of Patent: Dec. 10, 1985

[54] OPTICAL FIBER TAPS

[75] Inventors: Penny L. Beals, Redwood City; Phyllis M. Simon, Fremont; Bruce D. Campbell, Portola Valley, all of Calif.

[73] Assignee: Raychem Corporation, Menlo Park, Calif.

[21] Appl. No.: 437,054

[22] Filed: Oct. 27, 1982

[51] Int. Cl.⁴ .................................................. G02B 5/14
[52] U.S. Cl. ................................ 350/96.15; 250/227; 350/96.16
[58] Field of Search .................... 250/227; 350/96.15, 350/96.16

[56] References Cited

U.S. PATENT DOCUMENTS

| | | | |
|---|---|---|---|
| 3,931,518 | 1/1976 | Miller | 250/227 |
| 3,936,631 | 2/1976 | Muska | 250/227 |
| 3,982,123 | 9/1976 | Goell et al. | 250/227 |
| 4,019,051 | 4/1977 | Miller | 250/227 |
| 4,135,780 | 1/1979 | Dyott | 350/96.15 |
| 4,253,727 | 3/1981 | Jeunhomme et al. | 350/96.15 |
| 4,270,839 | 6/1981 | Cross | 350/96.15 |
| 4,294,513 | 10/1981 | Nelson et al. | 350/96.29 |

FOREIGN PATENT DOCUMENTS

| | | | |
|---|---|---|---|
| 2064503 | 12/1970 | Fed. Rep. of Germany | 350/96.15 |
| 54450 | 5/1977 | Japan | 350/96.15 |
| 138452 | 10/1979 | Japan | 350/96.15 |
| 151455 | 11/1979 | Japan | 350/96.21 |
| 1521778 | 8/1978 | United Kingdom | 350/96.15 |

OTHER PUBLICATIONS

Jeunhomme et al., *Applied Optics*, vol. 14, No. 10, Oct. 1975, "Mode Coupling in a Multimode Optical Fiber". . ., pp. 2400–2405.

*Primary Examiner*—William L. Sikes
*Assistant Examiner*—Frank González
*Attorney, Agent, or Firm*—Dennis E. Kovach; Herbert G. Burkard; T. Gene Dillahunty

[57] ABSTRACT

An optical fiber tap which is especially useful as a node in a ring topology data processing system. The tap, which does not interrupt the physical continuity of the fiber, has an open position and a closed position. In the open position, a signal passing down the optical fiber passes through the tap without alteration. In the closed position, a signal passing down the optical fiber is extracted through a first bend which is put into the fiber by the tap; the extracted signal, or an electrical counterpart thereof, is processed and a counterpart of the extracted signal, or a new signal obtained by operating on the extracted signal, e.g. in a data processor, is injected into the fiber through a second bend which is put into the fiber by the tap.

19 Claims, 3 Drawing Figures

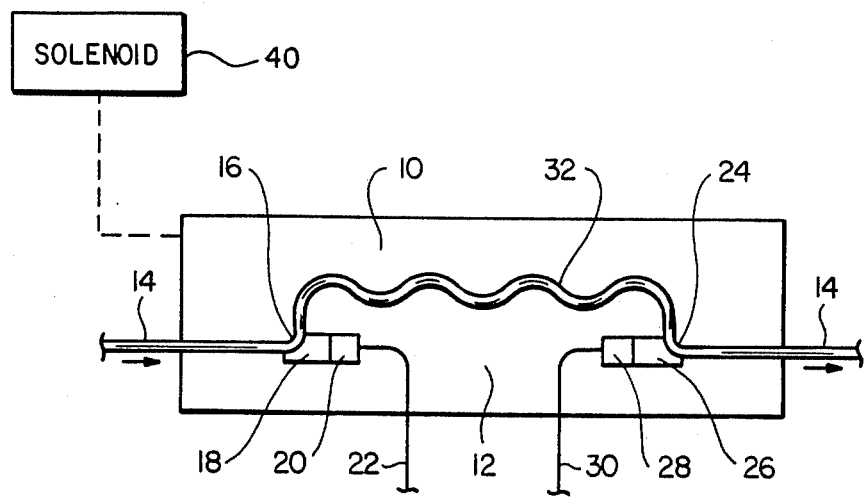
FIG_1
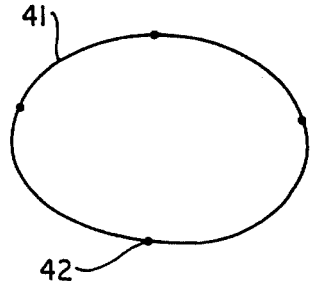
FIG_3
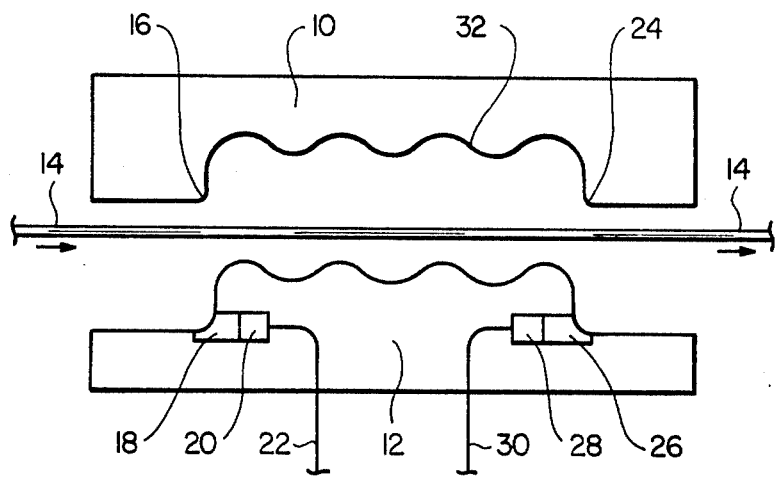
FIG_2

OPTICAL FIBER TAPS

BACKGROUND OF THE INVENTION

1. Field of the Invention

This invention relates to a non-destructive tap for an optical fiber, and especially to a tap used to provide a node in a ring topology data processing local area network.

2. Introduction to the Invention

In the past few years, as large scale integration of semiconductor circuitry has made microprocessors and microcomputers available, there has arisen an increased interest in methods of efficient interconnection into what are usually referred to as local area networks. The aim of the local area network is the connection of data processing nodes (terminals, computers, etc.) in such a manner that they may communicate with each other, sharing resources and exchanging information. Such networks are now commercially available from such manufacturers as Xerox Corporation (Ethernet ®) and Wang Laboratories (Wangnet ®).

Two general classes of physical link topologies are employed for these networks: bus and ring. The bus topology provides a bus which operates as a bidirectional transmission facility to which all the nodes are attached. Signals from one node enter the bus and propagate down it in both directions to its ends, where they are terminated. Such a topology provides a passive attachment mechanism: nodes may be added to or deleted from the network without disruption. In the ring topology, however, the nodes are connected by unidirectional transmission facilities to form a structure with a single closed path. Signals placed on the ring pass from node to node and are regenerated as they pass through each node. The attachment node has been referred to as active attachment, enabling all attached nodes to maintain synchronization. A disadvantage of the ring topology is, however, that the addition or deletion of nodes disrupts the network.

Approximately contemporaneously with the increase in networks has been interest in optical fibers as a data communications medium. Optical fibers offer substantial advantages over electrical conductors, particularly in bandwidth (enabling higher data transmission rates) and in immunity to electrical noise (requiring less shielding). Two principal disadvantages are fragility and difficulty of connection. Adequate techniques are now available for jacketing and strengthening optical fiber cables so that they can be used virtually as easily as conventional communications cable, and certainly as easily as high-bandwidth coaxial cable, and techniques for connection continue to improve.

It is when an optical fiber is proposed to be used as the communications medum in a ring network that a real disadvantage of optical fibers appears. When a node is removed from a ring network, the break in the ring occupied by the detector-data processor-transmitter of that node must be filled to establish connection between the nodes on either side of the removed node. For electrical circuitry, this is comparatively easy: a switch can be used to break the line and connect it to the node. The deterioration of signal quality when the node is switched out of the ring is minimal. However, when an optical fiber is used, connections cannot be as easily made and broken.

What is desired is an optical fiber tap which, when it is not activated, causes essentially no loss in the optical fiber and which, when activated, switches essentially the entire optical signal into/out of the essentially the entire optical signal into/out of the node.

In U.S. Patent Applications Ser. Nos. 258,079 (filed Apr. 27, 1981, now abandoned), 370,321 (filed Apr. 21, 1982, now abandoned) and 437,053 (filed Oct. 27, 1982), all of which are assigned to the assignee of the present application and the entire disclosures of which are incorporated herein by reference, there is described an apparatus for splicing two optical fibers. The apparatus incorporates means for coupling light into and out of the fibers to be spliced to aid alignment.

SUMMARY OF THE INVENTION

We have discovered that it is possible to produce a tap for an optical fiber, the tap having an open position in which it does not operate on the fiber and a closed position in which it does operate on the fiber, which enables the non-destructive tapping of an optical fiber. Such a tap may be used, for example, in a node in a ring topology local area network. The tap operates, when in its closed position, by bending the fiber to permit the detection of an optical signal passing down the fiber and the injection of an optical signal into the fiber.

BRIEF DESCRIPTION OF THE DRAWING

The invention is illustrated in the accompanying drawing, in which FIG. 1 shows the tap in its closed position, FIG. 2 shows it in its open position. FIG. 3 illustrates a ring network having a plurality of nodes therein.

DETAILED DESCRIPTION OF THE INVENTION

In a first aspect, this invention provides a tap for an optical fiber, the tap having an open position in which it does not operate on the fiber and a closed position in which it does operate on the fiber, comprising:

(a) a first bending means through which the fiber passes and which has an open position in which the fiber is not bent and a closed position in which the fiber is bent sufficiently to cause at least a portion of an optical signal passing down the fiber to escape from the fiber;

(b) a detecting means for detecting an optical signal which has escaped from the fibers when it is maintained in a bent configuration by the first bending means;

(c) a second bending means through which the fiber passes and which has an open position in which the fiber is not bent and a closed position in which the fiber is bent sufficiently to permit the injection of an optical signal into the fiber;

(d) injecting means for injecting an optical signal into the bent position of the fiber when it is maintained in a bent configuration by the second bending means; and (e) bender activating means for moving the first and second bending means between their open and closed positions.

In a second aspect this invention provides a method for the tapping of an optical fiber which comprises positioning the fiber within the tap or coupler of this invention and closing it.

Particular advantages of the tap of this invention include that (a) it is non-destructive, i.e. the fiber remains a continuous length and need not be broken and terminated to enable use of the tap, (b) even when the fiber is placed within the tap, passing through the bending means, the tap does not operate on the fiber when in its open position and there is substantially no attenuation induced by the tap, (c) the tap is readily movable between its open and closed positions, enabling tapping of the fiber only when desired, and (d) because the optical signals may be passed through the buffer of the fiber into and out of the fiber, the fiber need not be completely stripped and is thus less subject to breakage or environmental damage.

Optical fibers for telecommunications and data processing applications are generally of the glass-on-glass type, comprising a glass core (through which the optical signals travel), a glass cladding of a lower refractive index surrounding the core to enable it to act as a waveguide, and a relatively soft polymeric buffer, generally of a refractive index greater than the cladding, which surrounds the cladding. The buffer protects the cladding and the core and allows the fiber to be bent into (and maintained in) a bend of substantially smaller radius than would otherwise be possible. In the case of plastic-clad silica (PCS) fibers, which are contemplated especially for military use, and all-plastic fibers, the buffer and cladding may be the same. The buffer may be surrounded by a jacket. It is possible, by the use of the tap of this invention, to withdraw signals from or inject signals into, an optical fiber through the buffer. This is explained by Application Ser. Nos. 258,079, 370,321, and 437,053, referred to previously.

FIG. 1 shows the tap of this invention in its closed, or operating position. The tap comprises two matching blocks 10 and 12, designed to come together about an optical fiber 14, along which an optical signal may travel in the direction of the arrow. The receiver section of the tap comprises a first bending means 16, a first coupling means 18, and a detecting means 20, which may be connected by a signal line 22 (optical or electrical) to a data processor, etc. (not shown). The transmitter section comprises a second bending means 24, a second coupling means 26, and an injecting means 28, which may be connected by a signal line 30 to a signal source, e.g. the data processor. Located between the first and second bending means is a signal attenuation means 32, shown here as a means for inducing a series of bends in the fiber.

When the tap is in the closed position, so that the fiber 14 is held between blocks 10 and 12, at least a portion of a signal passing down the fiber in the direction of the arrow is caused to escape from the fiber by the bend maintained in the fiber by the first bending means 16. That signal is coupled into the detecting means 20 by coupling means 18, and is then available to an external device. The signal remaining in the fiber 14 beyond the first bending means may then be attenuated by signal attenuation means 32, to prevent confusion between the original signal and a signal to be injected into the fiber by the tansmitter. That signal, originating in some device external to the tap, passes into the injecting means 28, and is then injected, via second coupling means 26, into fiber 14 where it is held bent by the second bending means 24. The signal then passes down fiber 14 in the direction indicated by the arrow.

Though the tap has been shown as being bilaterally symmetric in construction, such is not a requisite of the invention, and the receiver and transmitter may be independently designed for optimum performance.

FIG. 2 shows the tap in its open position. Because the fiber 14 is not bent by the bending means or signal attenuation means, an optical signal may pass down it in the direction of the arrow substantially without attenuation, as if the tap were not present.

The bend radius of the fibers when maintained in its bent position by the first or second bending means will preferably be 1.5 to 15 mm, particularly 2 to 10 mm, especially 3 to 8 mm.

The angle between the signal entering or leaving the fiber at the bending means and the tangent to the fiber core at the point of impact of the signal will preferably be less than the acceptance angle of the fiber, for example less than 20°, particularly not more than 10°, especially substantially 0°. The point of impact of the signal is preferably at the point at which the bend maintained in the fiber by the bending means straightens out, so that the signal is preferably directed along an essentially straight piece of fiber. This is particularly important for the transmitter.

The coupling members should (a) conform to the surface of the fiber, (b) lie in the path of the optical signal, and (c) increase the proportion of the signal coupled into or out of the optical fiber. Each will preferably comprise a block of a resiliently deformable polymeric material, such as a polysiloxane, which is transparent to the optical signal and has a refractive index which is preferably approximately equal to the refractive index of the buffer of the fiber, for example within ±0.3, e.g. ±0.2, especially ±0.1, of the buffer refractive index. The material of the block preferably has a Young's modulus less than that of the buffer, for example less than $10^7$ N/m$^2$.

The signal attenuation means may comprise means for inducing a series of bends in the fiber, as it is well-known that bending a fiber leads to signal loss therefrom.

The tap should be easily movable between its open and closed positions by an actuating means 40. This motion may, for example, be performed by a solenoid. The solenoid may be biased such that the tap is normally open, and is closed when power is applied to the solenoid. In this way, if power to the tap is lost, the optical fiber is released and a signal may pass down the fiber unattenuated.

A further advantage of the tap of this invention is that it may be installed in an optical fiber loop 41 which forms the basis of a ring network (see FIG. 3) (for example, built into a socket box in a wall in a building within which the optical fiber loop is located) and only put into use when it is desired to add a node 42 to the ring at that point. Because the tap may be connected to the data processor of the node by separate signal lines (e.g. electrical signal lines), additional slack in the ring optical fiber is not required, and prewiring of a building for a network is rendered facile.

The tap is particularly useful when the signals passing down the optical fiber are Manchester encoded, so that they are detectable by a change in state of the photodetector rather than by a change in the intensity of the signal. Under these circumstances, the attenuation caused by the optical circuitry between one active node and the next is less critical than when magnitude detection is employed. A phototransistor is then a particularly useful photodetector.

What is claimed is:

1. A coupler for an optical fiber, the coupler having an open position in which it does not operate on the fiber and a closed position in which it does operate on the fiber, comprising:

first bending means through which the fiber passes and which has an open position in which the fiber is not bent and a closed position in which the fiber is bent sufficiently to cause at least a portion of an optical signal passing down the fiber to escape and be tapped from the fiber;

detecting means for detecting the tapped optical signal which has escaped from the fiber when it is maintained in a bent configuration by the first bending means;

signal attenuation means, located downstream of the first bending means, through which the fiber passes and which has an open position in which an untapped portion of the optical signal passing through the fiber is not attenuated and a closed position in which the untapped portion of the optical signal passing through the fiber is substantially attenuated to prevent confusion between the untapped portion of the optical signal and an optical signal to be injected;

second bending means, located downstream of the signal attenuation means, through which the fiber passes and which has an open position in which the fiber is not bent and a closed position in which the fiber is bent sufficiently to permit the injection of an optical signal into the fiber;

injecting means for injecting an optical signal into the bent position of the fiber when it is maintained in a bent configuration by the second bending means; and bending and attenuation activating means for moving the first and second bending means and the attenuation means between their open and closed positions.

2. The coupler of claim 1 which further comprises first coupling means which, when the first bending means is in its closed position, will (a) conform to the surface of the fiber, (b) lie in the path of an optical signal escaping from the fiber, and (c) increase the proportion of an optical signal escaping from the fiber which is received by the detecting means.

3. The coupler of claim 2 wherein the first coupling means comprises a curved solid resiliently deformable material.

4. The coupler of claim 2 wherein the bend radius of a fiber maintained by the first bending means is 1.5 to 15 mm.

5. The coupler of claim 2 which further comprises second coupling means which, when the second bending means is in its closed position, will (a) conform to the surface of the fiber, (b) lie in the path of an optical signal emitted from the injecting means, and (c) increase the proportion of an optical signal from the injecting means which is injected into the fiber.

6. The coupler of claim 5 wherein the second coupling means comprises a second curved solid resiliently deformable material.

7. The coupler of claim 5 wherein the bend radius of a fiber maintained by the second bending means is 1.5 to 15 mm.

8. The coupler of claim 1 wherein the fiber comprises a core surrounded by a cladding having an index of refraction lower than that of the core, and a buffer surrounding the cladding, the tapped optical signal passing through the buffer, the attenuated untapped optical signal passing through the buffer, and the injected optical signal passing through the buffer.

9. The optical coupler of claim 8, which further comprises:

first coupling means which, when the first bending means is in its closed position, will (a) conform to the surface of the buffer, (b) lie in the path of an optical signal escaping from the fiber, and (c) increase the proportion of the optical signal escaping from the fiber which is received by the detecting means, the first coupling means comprising a solid resiliently deformable material; and second coupling means which, when the second bending means is in its closed position, will: (a) conform to the surface of the fiber, (b) lie in the path of an optical signal escaping from the injecting means, and (c) increase the proportion of the optical signal from the injecting means which is injected into the fiber, the second coupling means comprising a second solid resiliently deformable material.

10. The coupler of claim 9 wherein the first and second bending means, and the attenuation means comprises first and second members having mating curved surfaces formed such that first mating curved surfaces form the first bending means, second mating curved surfaces form the second bending means downstream of the first bending means, and a series of third curved surfaces form the attenuation means disposed between the first and second bending means.

11. The coupler of claim 10, wherein the first and second solid resiliently deformable materials, have curved surfaces.

12. The coupler of claim 1 wherein the angle between the tangent to a fiber core maintained by the first bending means and an optical signal escaping from the fiber core is not more than 20°.

13. The coupler of claim 1 wherein the angle between an optical signal from said injecting means and a tangent to a fiber core maintainer by the second bending means is not more than 20°.

14. The coupler of claim 1 wherein the attenuation activating means is operationally connection to the bending activating means such that the first bending means, second bending means, and signal attenuation means are simultaneously movable between their open and closed positions.

15. The coupler of claim 1 wherein at least one of the activating means comprises a solenoid which is biased such that the means moved by the activating means is in its open position unless power is applied to the solenoid.

16. The tap of claim 1 wherein the attenuation activating means comprises means for bending the fiber, at a plurality of points, sufficiently to cause a substantial portion of the untapped portion of the optical signal passing down the fiber to escape from the fiber.

17. A ring network comprising a plurality of nodes interconnected by a ring-type optical fiber, at least one of the nodes having an optical coupler for tapping light from the optical fiber to derive information represented thereby, and for injecting light into the optical fiber, the injected light representing further information, the optical coupler having an open position in which it does not operate on the fiber and a closed position in which it does operate on the fiber, comprising:

first bending means through which the fiber passes and which has an open position in which the fiber is not bent and a closed position in which the fiber is bent sufficiently to cause at least a portion of an optical signal passing down the fiber to escape and be tapped from the fiber;

detecting means for detecting the tapped optical signal which has escaped from the fiber when it is maintained in a bent configuration by the first bending means;

signal attenuation to prevent confusion between the untapped portion of the optical signal and an optical signal to be injected means, located downstream from the first bending means, through which the fiber passes and which has an open position in which an untapped portion of the optical signal passing through the fiber is not attenuated and a closed position in which the untapped portion of the optical signal passing through the fiber is substantially attenuated;

second bending means, located downstream of the signal attenuation means, through which the fiber passes and which has an open position in which the fiber is not bent and a closed position in which the fiber is bent sufficiently to permit the injection of an optical signal into the fiber;

injection means for injecting an optical signal into the bent portion of the fiber when it is maintained in a bent configuration by the second bending means; and bending and attenuation activating means for moving the first and second bending means and the attenuation means between their open and closed positions.

18. The ring network as claimed in claim 17, wherein the fiber comprises a core surrounded by a cladding having an index of refraction lower than that of the core, and a buffer surrounding the cladding, the tapping optical signal passing through the buffer, the attenuated untapped optical signal passing through the buffer, and the injected optical signal passing through the buffer.

19. The ring network as claimed in claim 18, further comprising:

first coupling means which, when the first bending means is in its closed position, will (a) conform to the surface of the fiber, (b) lie in the path of an optical signal escaping from the fiber, and (c) increase the proportion of the optical signal escaping from the fiber which is received by the detecting means, the first coupling means comprising a curved solid resiliently deformable material;

a second coupling means which, when the second bending means is in its closed position, will (a) conform to the surface of the fiber, (b) lie in the path of an optical signal emitted from the injecting means, and (c) increase the proportion of an optical signal from the injecting means which is injected into the fiber, the second coupling means comprising a second curved solid resiliently deformable material.

* * * * *

UNITED STATES PATENT AND TRADEMARK OFFICE
CERTIFICATE OF CORRECTION

PATENT NO. : 4,557,550

DATED : December 10, 1985

INVENTOR(S) : Penny L. Beals et al.

It is certified that error appears in the above-identified patent and that said Letters Patent are hereby corrected as shown below:

Claim 13, line 3, "maintainer" should be --maintained--.

Claim 14, line 2, "connection" should be -connected--.

Claim 17, line 20, delete ""to prevent confusion between the"; delete line 21; line 22, delete "cal signal to be injected"; and line 29 following "attenuated" insert --"to prevent confusion between the untapped portion of the optical signal and an optical signal to be injected--.

Signed and Sealed this

Twenty-ninth Day of September, 1987

Attest:

DONALD J. QUIGG

Attesting Officer     Commissioner of Patents and Trademarks